June 5, 1934.　　　R. A. BLISH　　　1,961,657
DRINK MIXER
Filed May 23, 1931　　　2 Sheets-Sheet 1
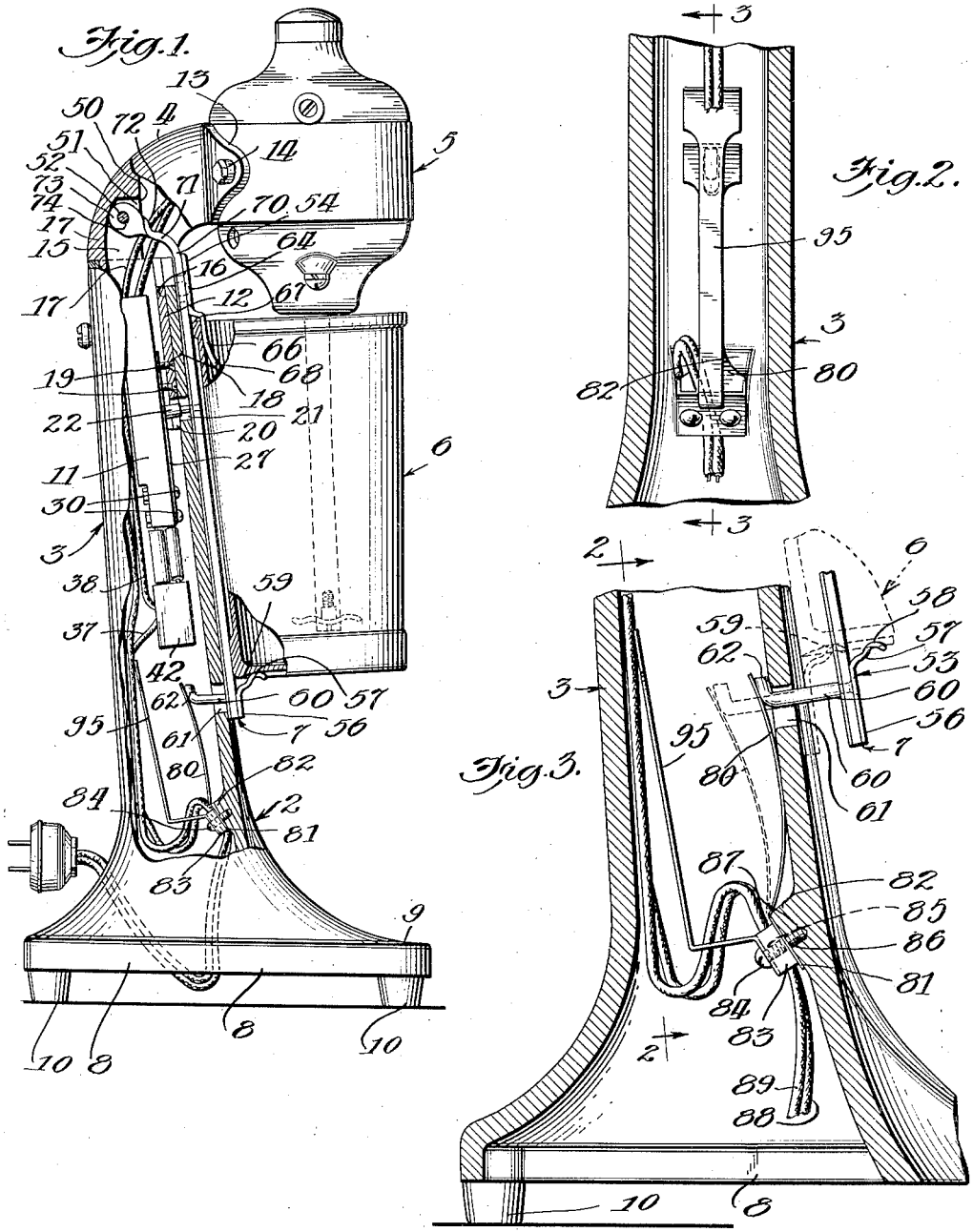
Inventor:
Russell A. Blish
By Fred L Gerlach
his Atty June 5, 1934.  R. A. BLISH  1,961,657
DRINK MIXER
Filed May 23, 1931  2 Sheets-Sheet 2

Inventor:
Russell A. Blish

Patented June 5, 1934

1,961,657

UNITED STATES PATENT OFFICE 1,961,657

DRINK MIXER

Russell A. Blish, Racine, Wis., assignor to Hamilton Beach Manufacturing Company, Racine, Wis., a corporation of Wisconsin Application May 23, 1931, Serial No. 539,505

3 Claims. (Cl. 259—108)

The present invention relates to drink mixers, and is particularly concerned with the provision of an improved drink mixer of the type illustrated and described in a co-pending application, Serial No. 331,239½, filed January 9, 1929.

An object of the invention is the provision of an improved container support for the drink mixer.

Another object of the invention is the provision of an improved drink mixer which includes a container support actuated by the weight of the container thereon, and means thereon for securing the container in operative position.

Another object of my invention is the provision of a drink mixer including a container support having resilient means associated therewith to assure the positive restoration of the support by the removal of the container and for positively releasing a motor control switch held in closed position during the operation of the mixer.

Another object of my invention is the provision of a drink mixer including a container support having resilient means associated therewith for maintaining the support in positive normal position against accidental movement.

A further object of my invention is the provision of a drink mixer having a motor control switch controlled by the movement of the container support and a condenser bridged across the contacts of the switch to prevent arcing of the contacts as they are opened and closed.

A still further object of my invention is the provision of a drink mixer including a standard for supporting the mechanism and spring means secured in the interior of the standard for detachably securing the conductors leading to the switch and motor in orderly arrangement to prevent interference with the mechanism contained therein.

Other objects not particularly pointed out will be apparent from the following description and from the accompanying drawings, in which like reference numerals in the several views denote corresponding parts and in which Fig. 1 is a side elevation of the drink mixer and container in operative position, the view having parts broken away more clearly to illustrate the invention;

Fig. 2 is a sectional view of the lower half of the standard taken on the line 2—2 of Fig. 3 and looking in the direction of the arrows indicated thereon;

Fig. 3 is a view on the line 3—3 of Fig. 2 and looking in the direction of the arrows indicated thereon;

Figure 4:
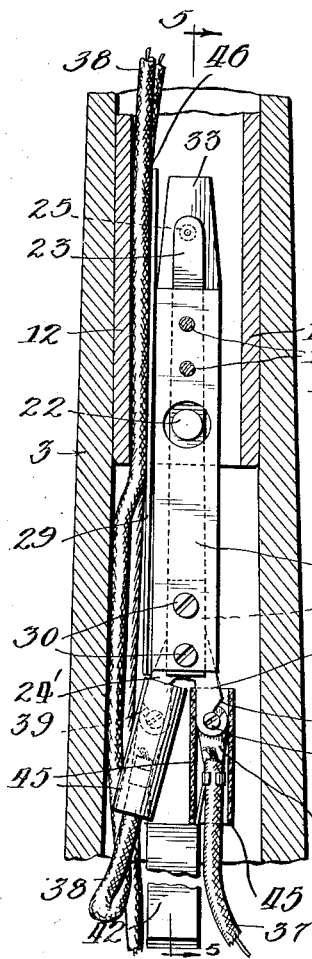
Fig. 4 is a longitudinal sectional view through the upper portion of the standard to illustrate clearly the motor control switch.

Referring to Fig. 1, the drink mixer assembly is indicated generally by the reference character 2, and includes a supporting standard 3, a motor supporting head 4, a motor 5, a container 6, and a container support 7.

The standard 3 comprises a hollow cast metal member provided with a base 8, the front side of which is bifurcated in order to form a pair of legs 9 between which the container 6 may be automatically centered. Rubber feet 10 at the rear corners and at the distal or front ends of the legs 9 are suitably secured to the base 8 and serve to absorb any vibration resulting from the operation of the mixer. The entire standard is coated with enamel or any other suitable material to give the standard an attractive appearance, as well as to provide a surface which may be easily cleaned to maintain it in a sanitary condition.

The standard 3 carries the motor supporting head 4 which is adapted to support the motor 5 as well as the container support 7. The head 4 also supports the motor control switch, indicated generally by the reference character 11, in such manner that the switch may be easily assembled with the supporting head before the head is attached to the standard.

The supporting head 4 comprises a hollow cast metal member having a tubular neck portion 12 which fits within the upper end of the standard 3. The head 4 is provided with a pair of laterally projecting ears 13 which are curved to fit the exterior of the motor housing. Screws 14 pass through apertures in these ears and have threaded engagement with tapped apertures in the motor housing in order to secure the motor 5 to the supporting head 4. The standard 3 is provided with an upper flat end 15 which is provided with a bore 16 of a size to receive slidably the tubular neck 12 of the supporting head 4. The head 4 is made of substantially the same width and depth as the upper end of the standard, so as to form a continuation thereof, and forms a shoulder 17 between the head and the tubular extension 12 and determines the position of the supporting head 4 in the standard 3.

The neck of the supporting head 4 is provided with a pair of countersunk apertures 18 adapted to receive the screws 19 which support the motor control switch 11 within the standard 3. The neck 12 is provided with a notched opening 20 which registers with an aperture 21 in the standard 3 through which extends a button 22 on the switch 11 when the head 4 is finally assembled with the standard.

The motor control switch 11 comprises a pair of resilient copper contact springs 23 and 24 and are provided at their ends with contacts 25. They are secured together at their opposite ends and are insulated from each other by strips 26 of suitable insulation material such as fiber. The contacts 23 and 24 and the insulation strips 26 separating the same, are secured between a metal plate 27 and an ear 28 integrally formed with a plate 29 and disposed at right angles thereto by bolts 30. The bolts 30 pass through suitable insulation sleeves 31 extending through apertures in the contact springs 23 and 24 and insulation strips 26 to insulate the bolts 30 from the respective contact springs 23 and 24. A strip of suitable insulation 32, such as mica, extends upward between the spring 23 and plate 27 and is clamped in position by the bolts 30 to insulate the spring from the plate 27. A strip of mica 33 also secured in position by the bolts 30 between the ear 28 and the contact spring 24 insulates the same from the plate 29 and extends upwardly in parallel relation with the spring 24 and prevents contacting of the spring 24 with the neck 12.

The contact spring 23 is provided with a button 22 of insulation material having a metal pin 35 molded therein for the purpose of riveting the button 22 on the contact spring 23. The adjacent metal plate 27 and mica insulation strip 32 are provided with apertures 36 through which the button 22 extends. The contacts 25 of the respective contact springs 23 and 24 are normally open and may be brought into circuit closing engagement by pressure on the button 22.

Figure 5:
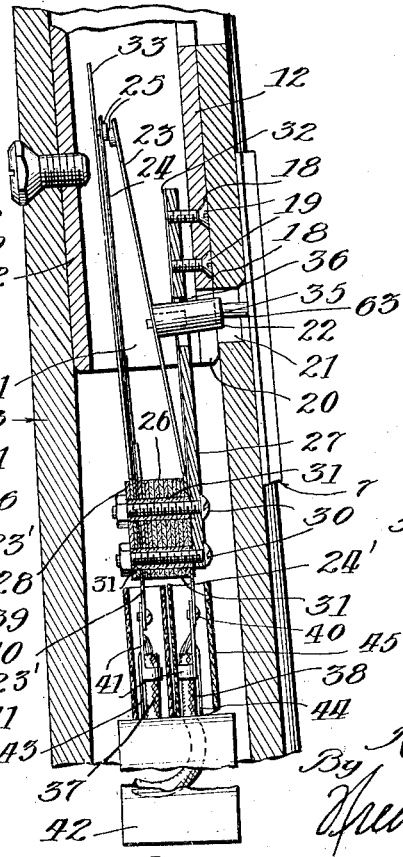
Fig. 5 is a sectional view on the line 5—5 of Fig. 4, looking in the direction of the arrows indicated thereon.
Figure 6:
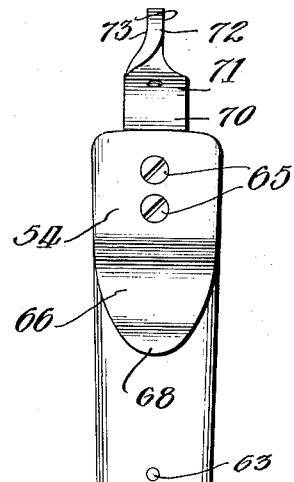
Fig. 6 is a front elevational view of the container support of the mixer.

The switch 11 may be supported within the neck 12 of the supporting head 4 by the screws 19 which extend through apertures 18 in the neck 12 and have threaded engagement with tapped apertures in the plate 27. As the plate 27 is flat and the interior of the neck 12 is cylindrical, the switch 11 is supported in spaced relation to the apertures 18 for the screws 19 (Fig. 5) but the plate 27 may be drawn into firm engagement with the cylindrical inner wall of the neck 12 by the screws 19 and the switch 11 firmly secured thereby.

The depending ends 23' and 24' of the contact springs 23 and 24 form terminals for connection with a pair of conductors 37 and 38. The terminals 23' and 24' are slotted as at 39 in order that screws 40, threaded into metal terminal clips 41 to which the conductors 37 and 38 are soldered, may be slid or inserted into slots 39 and secured therein by tightening the screws 40. A suitable condenser 42 of any known type, is provided with terminals 43 and 44 which may be soldered to the terminal clips 41 connected respectively to the terminals 23' and 24' to bridge the condenser 42 across the contact springs 23 and 24 to prevent arcing at the contacts 25 when the same are opened and closed. The condenser 42 depends from the terminal clips 41 into the interior of the standard 3 and is of such size and shape to fit readily therein. The terminals 23' and 24' and connections secured thereto, are covered by short sleeves 45 of suitable insulation and are retained in place by frictional engagement therewith and prevent shorting of the terminals and connections made thereto. The conductors leading to the motor pass upwardly through the neck 12 of the head 4 and are threaded through a channel 46 formed by the plate 29 and an adjacent portion of the neck 12. The plate 29 prevents the conductors which pass up to the motor from interfering with the contact springs 23 and 24 of the switch as clearly illustrated in Fig. 4.

The supporting head 4 is curved at substantially right angles to hold the motor in spaced relation to the standard and to provide sufficient room between the motor and standard for the container supporting mechanism. Within the supporting head 4 there are provided a pair of forwardly extending lugs 50 which are spaced from each other to form a slot 51. Transverse apertures extending from one side of the supporting head through the lugs 50 are adapted to receive a screw 52. This screw has threaded engagement with a tapped aperture in a lug 50 and serves as a pivotal support for the upper end of the container support member 7.

The container support member 7 is constructed of a relatively narrow strip of sheet metal which is provided at its lower extremity with a shoulder rest 53 for supporting the container 6 and at its upper end with a latching or retaining member 54 which overhangs the peripheral edge or rim of the container 6. The strip which comprises the container support member 7 is curved laterally to conform to the container 6 and the retaining member 54 is likewise given a complementary curvature to fit against the metal strip 7. The shoulder rest 53 comprises an angularly formed member having an attaching flange 56 for securing the member 53 to the free lower extremity of the support 7 by means of a riveting or spot welding operation. The other flange 57 which extends at right angles to the securing flange 56 is provided with a rib formation 58 to form a camming surface adapted to be engaged by the lower edge of the container 6 when placed in operative position on the support 7.

The container 6 may be of any convenient shape, but preferably comprises a stamped sheet metal member having a reinforced bottom which is slightly dished to form a shoulder 59. The engagement between the rib formation 58 and the bottom surface of the container at shoulder 59, when the upper peripheral edge of the container is in position beneath the retaining member 54, is sufficient to retain the container 6 on the support member 7. A stop pin 60 is secured to the member 7 near its lower extremity and extends rearwardly through an aperture 61 in the standard 3 into the interior of the same, and has its free end bent at substantially right angles to provide a stop 62 which engages the inside wall of the standard 3 adjacent the aperture 61 to limit the outward pivotal movement of the container support 7 under the influence of spring means as will be hereinafter described. The container support 7 also carries a switch actuating member comprising a pin 63 which is secured to the rear face of the member 7 and extends into the aperture for engagement with the button 22 of the switch 11.

The latching or retaining member 54 comprises a sheet metal member having a curved portion 64 which is complementary to the curvature of the strip comprising the container support 7, and is removably secured thereto by screws 65. The member 54 is provided with a forwardly and downwardly extending tongue or finger 66 which is spaced from the strip 7 to form a slot 67 to receive the peripheral rim of the container 6. The lower extremity of the finger 66 is curved or bent forwardly to provide a camming surface 68 and is adapted to guide the container 6 into the slot 67. The finger 66 is curved complementary to the exterior surface of the container so that the peripheral rim of the container 6 is received in a curved complementary slot 67 which permits sliding rotative movement of the container but positively prevents any wobbling or other movement when the parts are in position as shown in Fig. 1.

The upper end of the container support is reduced in width as at 70, and is bent rearwardly as at 71. The reduced portion 70 is twisted through an angle of 90 degrees at the rear of the bend 71 as at 72, to form a flat portion 73 which is positioned in the slot 51 formed by the forwardly extending lugs 50. The screw 52 passes through an aperture 74 in the portion 73 and thus pivotally supports the container support 7.

The container 6 and its contents may be placed in mixing position by moving the container up from below the motor 5 until its upper peripheral edge or rim is in the slot 67. This upward movement of the container 6 is continued until the bottom edge of the container has been lifted sufficiently to be slid over the rib formation 58 of the support or rest 54. Sufficient clearance is provided between the rib formation 58 and the latch 64 so that the sliding of the bottom edge of the container 6 over the rib 58 may be accomplished and the container seated on rib 58, and the pivotal movement of the bottom of the container to position the container on the support 7 is permitted as the slot 67 has sufficient tolerance for such pivotal movement of the container when positioned in the slot. The container 6 is thus seated against the support 7 with the latch 54 overhanging the peripheral rim of the container and the bottom of the same resting against the rib formation 58 to firmly hold the container in position for mixing the ingredients contained therein. The weight of the container and its contents is adapted to cause the container support 7 to pivot about the screw 52 and move inwardly to position the same in substantially parallel relation with the standard 3. The pin 63 on the support 7 which engages the button 22 causes movement of the spring 23 to place the contact 25 thereon in engagement with the contact 25 on the spring 24 automatically to close the motor circuit.

The container 6 may be removed from the support 7 by lifting upward on the container and a very slight upward movement of the container is sufficient to withdraw the shoulder 59 in the bottom of the container from the rib formation 58. The bottom of the container may now be pivoted outwardly to remove it from the support 7 and the container may then be moved downward from beneath the motor and its agitator.

As the container 6 is positioned on the support 7, the rearward movement of the same under the influence of the container weight and its contents urges the spring 23 toward the spring 24 to close the contacts 25. Upon removal of the container from the support 7, the flexed contact spring 23 tends to pivot the support outwardly and open the contacts 25. To assure a positive pivotal movement of the support 7 upon the removal of a container from the support, an auxiliary leaf spring 80 is provided which cooperates with the stop 62 which limits the outward movement of the support 7 from the standard 3.

The leaf spring 80 is provided with an angularly disposed end portion 81 which is complementary to the angularly formed lug 82 on the inner wall of the standard 3. The angular portion of the spring 80 is clamped between the lug 82 and a U-shaped clip 83 by screws 84 passing through suitable apertures 85 and 86 in the clip 83 and portion 81 of the spring and having threaded engagement with tapped apertures 87 in the lug 82. The screws 84 secure the spring 80 against movement and also secure the clip 83 which provides means to support the conductors 88 and 89 extending into the interior of the standard 3. The spring 80 is provided with a concave curvature along its major axis to provide the spring with a predetermined tension.

The free end of the spring 80 engages the stop 62 and the normal tension of the spring 80 is such as to urge the support 7 outwardly, and this outward movement of the support 7 from the standard 3 is limited by the stop 62 which engages the inner wall of the standard adjacent the aperture through which the pin 61 forming the stop extends. When a container and its contents is positioned on the support 7 the inward pivotal movement of the same causes the stop 62, which is in engagement with the spring 80, to flex the same into the position illustrated in dotted lines in Fig. 3 and thus place the spring under additional tension.

As the container is removed from the support 7, the spring 80 which was placed under tension by the pivotal inward movement of the support 7 now urges the same outwardly, and this outward movement of the support 7 is limited by the stop 62 engaging the inner wall of the standard 3. The spring 80 assures a full outward movement of the support each time a container is removed from the same and also assures a positive interruption of the contacts 25 to open the motor circuit. The spring 80, as before set forth, is normally under a predetermined tension and thus maintains the support 7 in its extreme outward position at such times as there is no container supported thereon. The spring also resists accidental inward pivotal movement of the container support which may be caused by bumping or touching, and prevents the accidental operation of the motor switch. While the tension of the spring 80 is such as to maintain the support in its normal position away from the standard 3 and prevent accidental inward movement, the weight of the container and its contents is sufficient, however, to overcome the normal tension of the spring 80 and permit inward pivotal movement of the support and the closure of the motor circuit at the switch.

A leaf spring 95, supported on the clip 83 and clamped in position between the screws 86 and the clip 83, extends upwardly and rearwardly and is provided with diametrically opposite lateral extensions or wings at its free end, as clearly illustrated in Fig. 2. The conductors 88 and 89, extending up through the hollow standard to the switch 11 and motor 5, are engaged by the free end of the spring 95 and maintained against the wall of the standard by the tension of the spring 95. The spring 95 and the clip before described, thus maintain the conductors 88 and 89 in position against disarrangement in the base of the standard.

While I have illustrated and described a preferred form of construction and a particular type of mixer, I do not, however, wish to be limited to the exact structure as shown but aim to cover all such changes and modifications as come within the spirit and scope of the appended claims.

I claim:

1. In a drink mixer, the combination with a supporting standard, a motor, a supporting head for said motor secured in the upper end of said standard, a container support mounted in said head and depending exteriorly of said standard and adjacent thereto, a motor control switch controlled by the movement of said support, a stop secured to the lower end of said container support, and spring means secured in said standard cooperating with the stop whereby the container support is yieldingly held in its normal position away from the standard and limited by said stop, said support being capable of movement toward the standard under the weight of the container to actuate said switch.

2. In a drink mixer, the combination of a hollow standard, an electric motor supported at the upper end of the standard and adapted to drive a depending agitator, a container support pivotally mounted on said standard and having means for supporting a container in an operative position around the agitator, a motor control switch normally urged to open position and adapted to be closed by movement of said container support, an auxiliary spring engaging said container support at a point distant from its pivotal support for assuring quick break of said control switch, conductors connecting said motor and said control switch and located in said hollow standard, and resilient means for holding said conductors in spaced relation to the mechanism of said container support.

3. In a drink mixer of the character described, the combination of a standard, an electric motor supported at the upper end of the standard and adapted to drive a depending agitator, an elongated, vertically extending, container-supporting member pivoted at its upper end and arranged so that it swings towards the standard upon placement of the container thereon, a switch for controlling the motor positioned and arranged so that it is shifted into its closed position in response to movement of the member towards the standard, stop-means for limiting movement of the member away from the standard, and a spring applied to said stop-means so as to urge the member away from the standard for switch-opening purposes when the container is removed from said member.

RUSSELL A. BLISH.